(12) United States Patent
Kurmlavage (10) Patent No.: US 11,470,989 B2
(45) Date of Patent: Oct. 18, 2022

(54) ROLLER GRILL ASSEMBLY CANOPY

(71) Applicant: Spirit Specialty Solutions, Inc., Broomall, PA (US)

(72) Inventor: Michael M Kurmlavage, Monroeville, NJ (US)

( * ) Notice: Subject to any disclaimer, the term of this patent is extended or adjusted under 35 U.S.C. 154(b) by 895 days.

(21) Appl. No.: 16/264,741

(22) Filed: Feb. 1, 2019

(65) Prior Publication Data

US 2020/0245786 A1 Aug. 6, 2020

(51) Int. Cl.
*A47F 10/06* (2006.01)
*A47J 37/07* (2006.01)
*A47J 37/04* (2006.01)

(52) U.S. Cl.
CPC .............. *A47F 10/06* (2013.01); *A47J 37/048* (2013.01); *A47J 37/0786* (2013.01); *A47F 2010/065* (2013.01)

(58) Field of Classification Search
None
See application file for complete search history.

(56) References Cited

U.S. PATENT DOCUMENTS

| | | | |
|---|---|---|---|
| 5,551,774 A * | 9/1996 | Campbell et al. | A47G 19/26 312/284 |
| 6,393,971 B1 | 5/2002 | Hunot | |
| 9,747,823 B2 * | 8/2017 | Lorenzini et al. | A45D 19/04 248/188.8 |
| 9,795,252 B1 | 10/2017 | Mandeltort | |
| 2004/0189156 A1 * | 9/2004 | Peralman | A47B 96/18 312/137 |
| 2011/0056387 A1 * | 3/2011 | Kurmlavage | A47J 36/00 99/352 |
| 2011/0080075 A1 * | 4/2011 | Matus, Jr. | A47F 9/00 312/140.4 |

FOREIGN PATENT DOCUMENTS

KR 20120125822 A * 11/2012 ........... A47B 95/043

OTHER PUBLICATIONS

Machine translation of KR 20120125822 A performed on Dec. 16, 2021, Jeong (Year: 2012).*

* cited by examiner

*Primary Examiner* — Brian W Jennison
*Assistant Examiner* — Kevin Guanhua Wen
(74) *Attorney, Agent, or Firm* — Argus Intellectual Enterprise; Daniel Enea; Jordan Sworen (57) ABSTRACT

Provided is a canopy cover for a roller grill assembly that works in conjunction with a roller grill food separating device. The canopy includes a pair of support brackets that contact the sidewalls of the roller grill to support the canopy thereon. The canopy support brackets include cutouts for positioning a food separating device on the grill assembly. The configuration of the cutouts allows the food separating device support brackets to rest between the ends of the canopy support brackets and on the roller grill. The canopy further includes a pair of canopy header brackets for supporting a header graphic custom sign positioned above the roller grill. The canopy provides a sanitary cover for a roller grill and a food separating device that permits segregation of food products on the grill surface, protects the food from contaminants, and provides support for an advertising sign.

20 Claims, 6 Drawing Sheets

ROLLER GRILL ASSEMBLY CANOPY

BACKGROUND OF THE INVENTION

1. Field of the Invention

The present invention relates to a canopy for use with a roller grill. More particularly, it pertains to a canopy cover for a roller grill assembly that works in conjunction with a roller grill food separating device in order to segregate the food products on the grill surface while protecting the food from contaminants.

In this era of fast food, individuals are increasingly dependent on quick service restaurants and convenience stores for a meal. Beginning in the 1960s and increasing in popularity ever since, the roller grill became an efficient way to cook and store hot dogs and other products to be made readily available to consumers without being labor intensive. With the advent of roller grills, these products can be prepared without the necessity of the store clerk flipping or rolling the grilled food by hand throughout the day. The development of the gas station/convenience store made this type of food even more widely available and popular.

With opportunities to sell more products in these numerous establishments, the industry began offering additional types of hot dog products, such as sausage, quarter-pound hot dogs, spicy and mild kielbasa, alternative meat hot dogs, such as turkey, beef or soy, and the like. All of these foods are still best prepared using the roller grill. Presently roller grills are still the leading hot dog cooker of choice for national convenience store chains, vending operations, and cafeterias. These roller grills can be used on the front serving counter where customers serve themselves or on the back counter where a store employee takes an order from a customer and assembles and serves the food product.

In a roller grill that can cook many food products at one time, it is not always the case that one type of product is placed on the grill and removed from the grill all at once. Rather, the number of the products on the grill gradually decreases based on sales, and a grill operator accordingly keeps adding uncooked food to the grill. Therefore, cooked products and uncooked products are on the grill at the same time, and it is possible that uncooked products might contaminate cooked products. To prevent such issues of contamination, grill separating devices are often utilized. These devices often include a pair of support brackets, a pair of crossover bars, and a plurality of separator bars that are positioned between the grill rollers. The separators rest on the top of the grill housing and can be easily removed for cleaning or when use thereof is not desired.

Another form of contamination inherent with the use of roller grills comes from the inherent open-top design that makes the food products susceptible to airborne contaminants, such as those created by coughs and sneezes. To prevent the food products from being contaminated by airborne viruses and bacteria, roller grill covers are often utilized. These devices generally include a transparent cover that is placed over top of the roller grill to function as a cough/sneeze guard. The problems inherent in the design of conventional grill covers is that they make contact with the entire grill housing, and do not allow for the use of a food separating device. As can be appreciated, users are often forced to choose between the use of a food separating device to prevent contamination caused by mixing cooked and uncooked food products, or the use of a grill cover that prevents the spread of airborne pathogens from coughs and sneezes.

As can be seen by the foregoing, the main problem inherent in current methods for cooking food products on a roller grill is the need to separate the various types of products and to prevent airborne contamination thereof. It is clear from the above description that a need exists for a roller grill cover that works in conjunction with a food separating device

2. Description of the Prior Art

Devices have been disclosed in the prior art that relate to roller grill covers. These include devices that have been patented and published in patent application publications. These devices generally relate to canopies and covers that are placed over top of a roller grill. The following is a list of devices deemed most relevant to the present disclosure, which are herein described for the purposes of highlighting and differentiating the unique aspects of the present invention, and further highlighting the drawbacks existing in the prior art.

U.S. Pat. No. 6,393,971 B1 (Hunot) discloses a sneeze guard that is mounted to the housing of a roller grill assembly. The sneeze guard comprises a flat roof which has left leg supports and right leg supports. An open passageway is formed between the leg supports, and further includes a front and rear opening.

US 2004/0189156 A1 (Pearlman) discloses a combination roller grill and sneeze guard assembly. The device includes a roller grill assembly having a top cooking surface and a sneeze guard that is securable over the top cooking surface of the roller grill assembly. The sneeze guard further includes an elongated groove formed in a top surface thereof, and a sign having a bottom edge secured in the elongated groove of the sneeze guard.

U.S. Pat. No. 9,795,252 B1 (Mandeltort) discloses a roller grill cover comprising an elongated body that extends over the length of the grill rollers. The cover further includes a pair of arms for engaging the top of the sides of the roller grill to provide stability for the cover; a front flange angled downwardly from the front end of the body, and a rear flange that extends upwardly from the rear end of the body.

While these prior art devices disclose roller grill sneeze guards and covers, these devices do not work in conjunction with a roller grill food separating device, do not include canopy support brackets with cutouts that allow the brackets to contact and rest between the canopy support brackets and upon the roller grill, and do not include canopy header brackets for supporting a header graphic custom sign positioned above the roller grill. From the foregoing, it is evident that a need exists for a roller grill cover that can be used with a food separating device.

SUMMARY OF THE INVENTION

The present invention overcomes the problems inherent with using roller grill covers with food separating devices by providing a canopy cover for a roller grill assembly that works in conjunction with a roller grill food separating device. The canopy comprises a pair of support brackets extending above the roller grill assembly. The brackets contact the sidewalls of the roller grill to support the canopy thereon. The canopy support brackets further include cutouts for positioning a food separating device on the grill assembly. The configuration of the cutouts allows the food separating device support brackets to contact and rest between the canopy support brackets and upon the roller grill. The canopy further includes sidewalls, a front and back cover, a top cover, and a pair of canopy header brackets for supporting a header graphic custom sign positioned above the roller grill. The device provides a sanitary cover for a roller grill and food separating device to allow for segregation of food products on the grill surface while protecting the food from contaminants and while providing support for an advertising sign.

The present invention substantially diverges in design elements from the prior art and consequently it is clear that there is a need in the art for an improvement to roller grill canopy covers. In this regard the instant invention substantially fulfills these needs.

OBJECTS OF THE INVENTION

In view of the foregoing disadvantages inherent in the known types of roller grill canopy covers now present in the prior art, the present invention provides a new roller grill canopy cover wherein the same can be utilized with a conventional roller grill to provide a canopy cover that works in conjunction with a food separating device.

It is therefore an object of the present invention to provide a new and improved roller grill canopy cover that has all of the advantages of the prior art and none of the disadvantages.

It is another object of the present invention to provide a roller grill canopy cover that works in conjunction with a roller grill food separating device to allow for the segregation of the food products on the grill surface.

Another object of the present invention is to provide a roller grill canopy cover having a pair of support brackets with cutouts that allow the food separating device to contact and rest between the canopy support brackets and upon the roller grill.

Yet another object of the present invention is to provide a roller grill canopy cover that includes a pair of canopy header brackets for supporting a header graphic custom sign positioned above the roller grill.

The roller grill canopy cover may be readily fabricated from materials that permit relative economy and are commensurate with durability. Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Reference is made herein to the attached drawings. Like reference numerals are used throughout the drawings to depict like or similar elements of the roller grill canopy cover. For the purposes of presenting a brief and clear description of the present invention, the preferred embodiment will be discussed as a sanitary cover for a roller grill assembly and a food separating device. The figures are intended for representative purposes only and should not be considered to be limiting in any respect.

Figure 1:
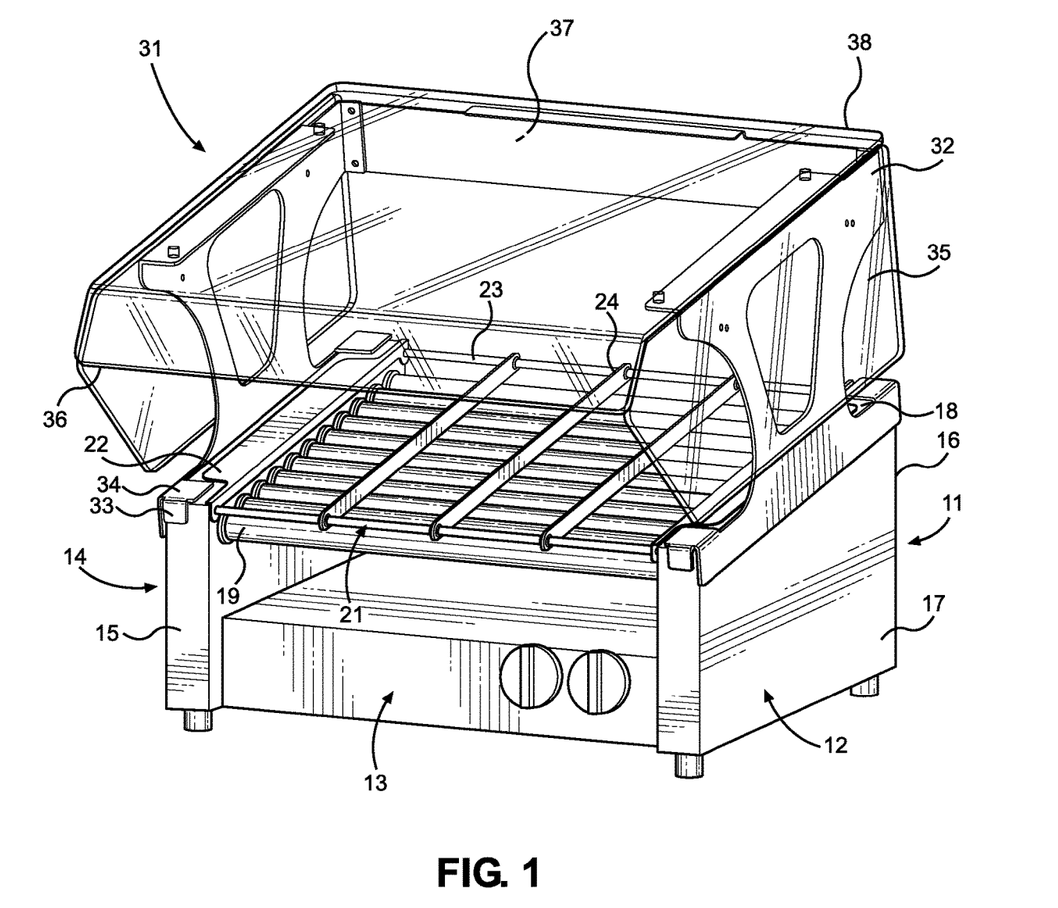
FIG. 1 shows a perspective view of the roller grill assembly, food separating device, and canopy cover.

Referring now to FIG. 1, there is shown a perspective view of the roller grill assembly 11, food separating device 21, and canopy cover 31. The roller grill assembly 11 comprises a housing 12 having a main body 13 and a pair of sidewalls 14 extending above the body 13 and further includes front 15, back 16, side 17, and upper 18 surfaces, a plurality of spaced apart tubular rollers 19 disposed between the sidewalls 14, and a heating element (not shown). Positioned on top of the roller grill assembly 11 is the food separating device 21, comprising a pair of support brackets 22 for supporting the food separating device 21 on the roller grill sidewall upper surfaces 18, a pair of crossover bars 23, and a plurality of separator bars 24 that extend perpendicular to the rollers 19.

The canopy cover 31 comprises a pair of canopy support brackets 32 extending above the roller grill assembly 11. The brackets 32 contact the front 15, back 16, side 17, and upper 18 surfaces of the roller grill sidewalls 14 to support the canopy 31 when positioned on the roller grill 11. The support brackets 32 further comprise a pair of vertical and horizontal tabs 33, 34 to allow the food separating device support brackets 22 to contact and rest between the canopy support brackets 32 and upon the upper surfaces 18 of the roller grill sidewalls 14 to support the food separating device 21 thereon.

The canopy cover 31 further comprises a pair of canopy sidewalls 35 attached to the canopy support brackets 32, a front canopy cover 36 attached to the support brackets 32, a back canopy cover 37 attached to the brackets 32, and a top canopy cover 38 attached at either end to the brackets 32 and to the front and back canopy covers 36, 37.

Figure 2:
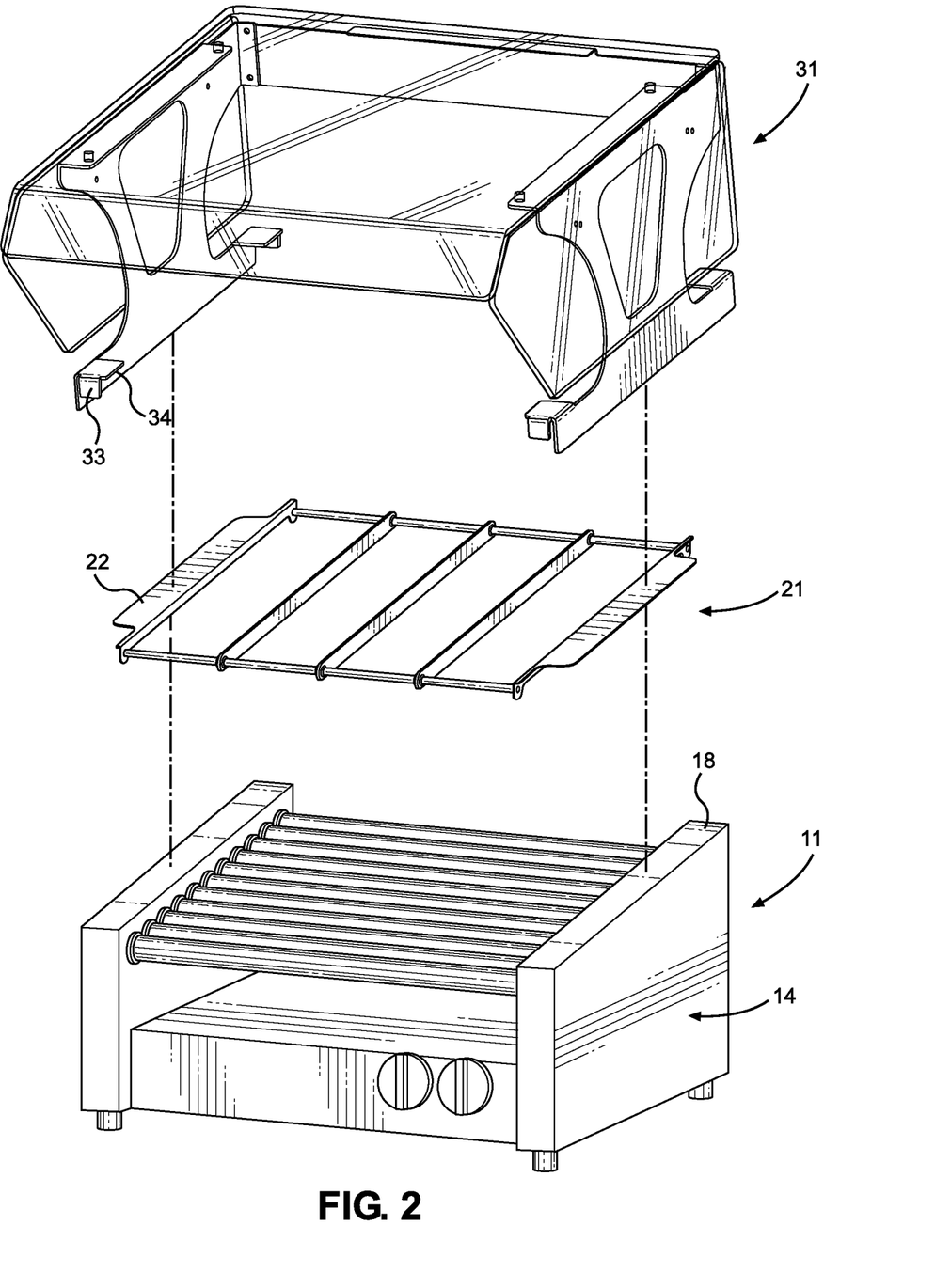
FIG. 2 shows an exploded view of the roller grill assembly, food separating device, and canopy cover.

Referring now to FIG. 2, there is shown an exploded view of the roller grill assembly 11, food separating device 21, and canopy cover 31. The canopy 31 and food separating device 21 are designed to rest upon the upper surfaces 18 of the roller grill sidewalls 14. The food separating device support brackets 22 make contact with and cover a portion of the sidewall upper surfaces 18. Preferably, the support brackets 22 are supported by the central area of the brackets 22, while the vertical and horizontal tabs 33, 34 of the canopy cover 31 make contact with and are supported by the distal ends of the sidewall upper surface 18. When positioned thereon, the combination of the food separating device support brackets 22 and the vertical and horizontal tabs 33, 34 substantially cover the entire surface of the sidewall upper surface 18. This configuration secures the food separating device 21 in position on the roller grill sidewalls 14 and prevents movement thereof.

Figure 3:
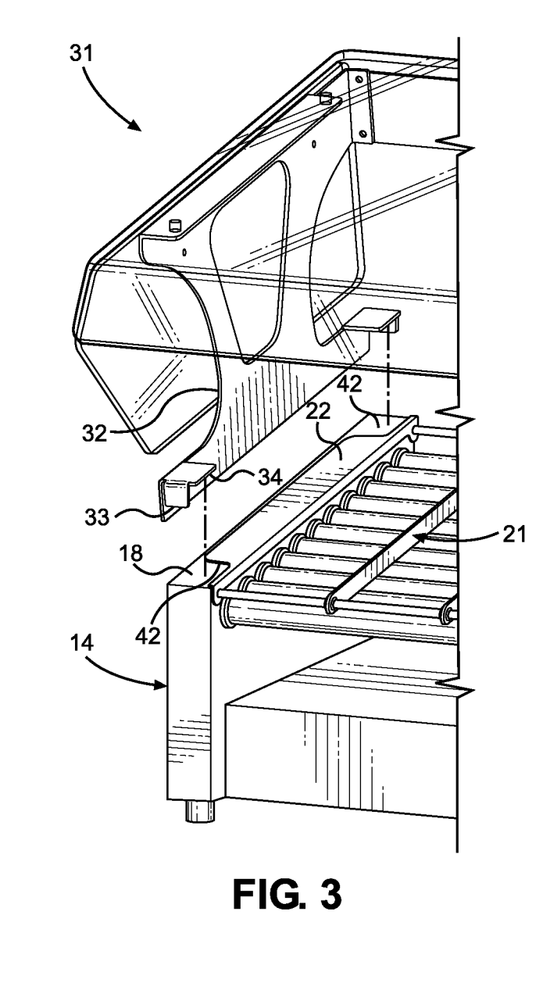
FIG. 3 shows an exploded view of the canopy support brackets, the food separating device support brackets, and the roller grill sidewalls.

Referring now to FIG. 3, there is shown an exploded view of the canopy support brackets 32, the food separating device support brackets 22, and the roller grill sidewalls 14. The canopy cover 31 is held in position on the roller grill sidewalls 14 and over top of the food separating device 21 via the vertical and horizontal tabs 33, 34. The horizontal tabs 33 support the weight of the canopy cover 31 on the roller grill sidewalls 14. The vertical tabs 34 secure the canopy cover 31 and prevent it from sliding along the length of the sidewall upper surface 18. The canopy support brackets 32 preferably extend down and below the vertical tabs 33 to create an L-shaped configuration with the horizontal tabs 34, which prevents the canopy 31 from sliding along the width of the sidewall upper surface 18.

Figure 4:
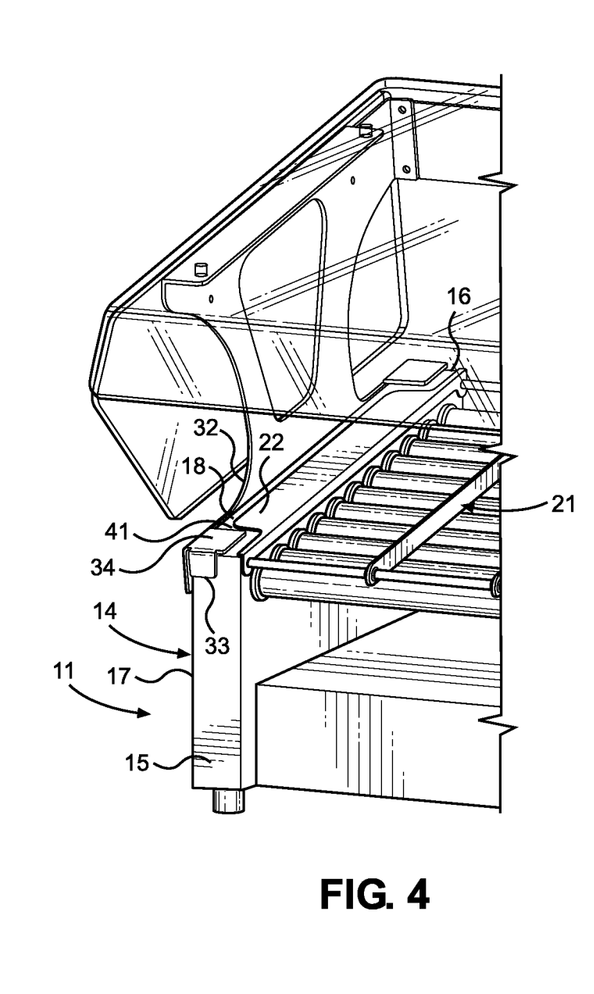
FIG. 4 shows a perspective view of the canopy support brackets and the food separating device support brackets positioned on the roller grill sidewalls.

Referring now to FIG. 4, there is shown a perspective view of the canopy support brackets 32 and the food separating device support brackets 22 positioned on the roller grill sidewalls 14. When positioned on the roller grill 11, the canopy support brackets 32 and vertical and horizontal tabs 33, 34 cover the front 15, back 16, side 17, and upper 18 surfaces of the roller grill sidewalls 14. As is clearly illustrated, the support brackets 22 of the food separating device 21 and the canopy support brackets 32 are both supported on the upper 18 surface of the sidewall 14. As best illustrated in FIG. 3, the support bracket 22 of the food separating device 21 comprises a pair of cutouts 42 on the terminal ends that permit the horizontal tab 34 to share the upper 18 surface of the sidewall 14. As shown, there can be a small gap 41 between the horizontal tab 34 and the support bracket 22. Alternatively, the tab 34 and the support bracket 22 can be configured to cover the entire upper 18 surface so that edges of the tab 34 and the support bracket 22 contact one another.

Figure 5:
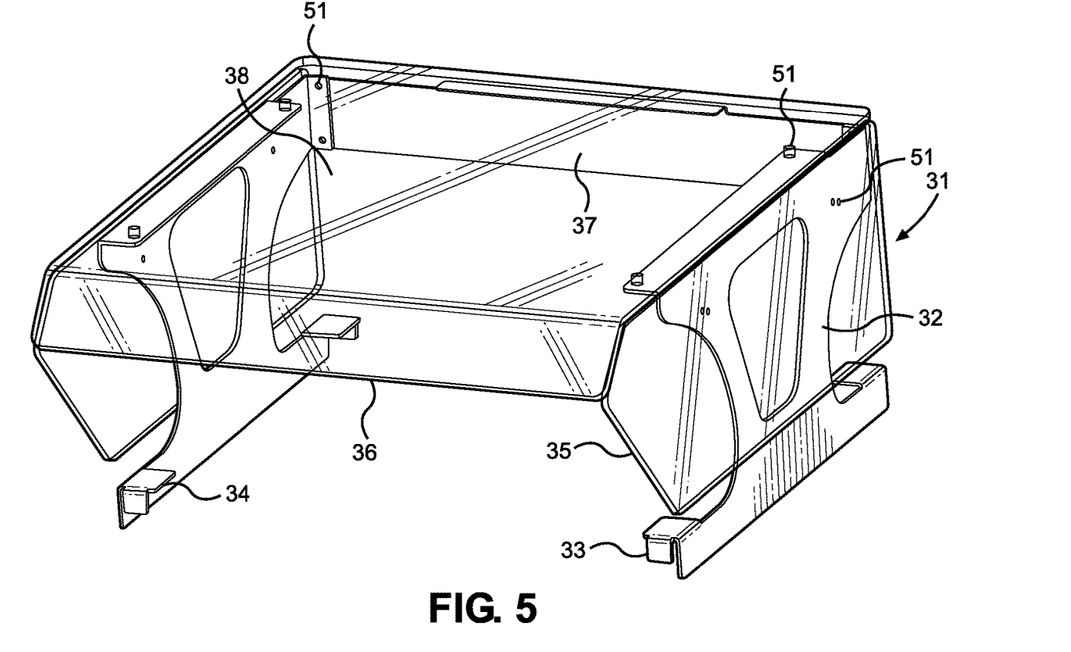
FIG. 5 shows a perspective view of the canopy cover.

Referring now to FIG. 5, there is shown a perspective view of the canopy cover 31. The cover 31 comprises a pair of canopy support brackets 32 that each include a pair of vertical and horizontal tabs 33, 34, a pair of canopy sidewalls 35 attached to the support brackets 32, a front canopy cover 36 attached to the brackets 32, a back canopy cover 37 attached to the brackets 32, and a top canopy cover 38 attached at either end to the brackets 32 and to the front and back canopy covers 36, 37. The canopy cover 31 primarily functions as a sneeze guard to prevent contamination of food that is cooking on the roller grill assembly. As can be appreciated, consumers and/or workers that cough or sneeze within close proximity of the grill assembly may inadvertently spread bacteria, viruses, and the like onto the grill and the food cooking thereon. The canopy sidewalls 35, front cover 36, back cover 37, and top cover 38 substantially create a barrier around the grill surface, thereby preventing the spread of contaminants thereto.

Preferably, the walls of the canopy cover 31 are constructed of a transparent plastic material, such as polycarbonate. Alternatively, the walls of the canopy cover 31 can be constructed from a translucent or solid material, and may be formed from plastic, metal, and the like. The walls of the canopy cover 31 are preferably attached to the brackets 32 via screws 51, however the brackets 32 and walls can be glued together or molded from a single piece of material.

Figure 6:
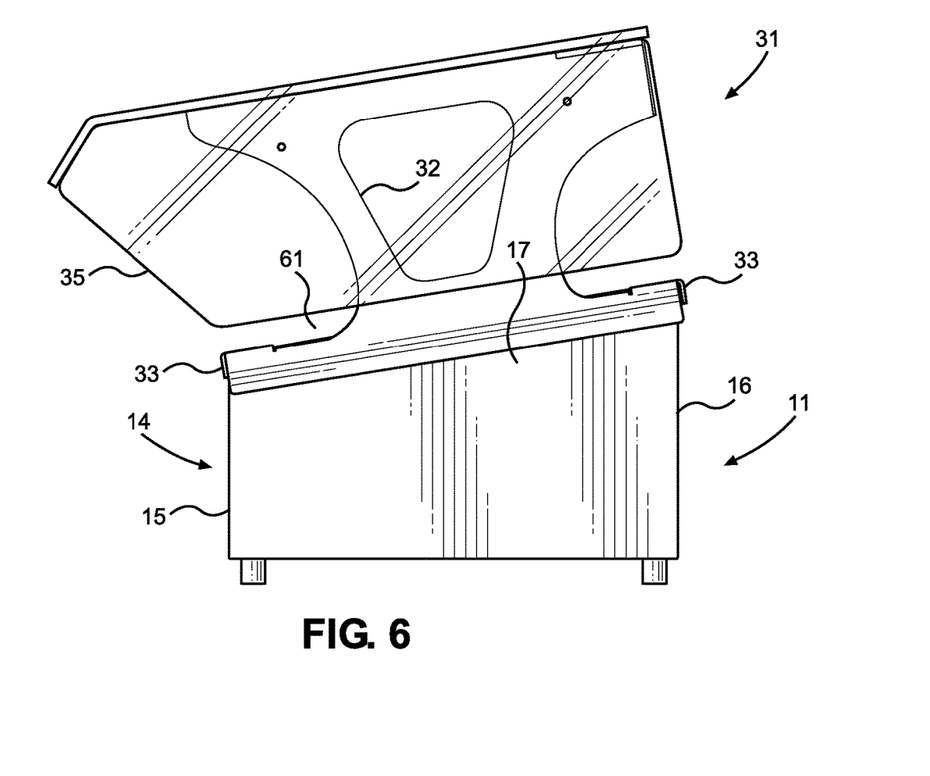
FIG. 6 shows a side view of the canopy cover positioned on the roller grill.

Referring now to FIG. 6, there is shown a side view of the canopy cover 31 positioned on the roller grill 11. The canopy support brackets 32 support the cover 31 on the sidewalls 14 of the grill 11. As shown, the vertical tabs 33 extend down and make contact with the front and back 15, 16 surfaces of the sidewalls 14. As many roller grills include a sloped sidewall configuration, any canopy resting thereon is liable to slide forward and fall off the grill. The vertical tabs 33 secure the canopy 31 in position on the sidewalls 14 and prevent the canopy 31 from moving along the length of the sidewalls 14. Additionally, the support brackets 32 extend down below the surface of the sidewalls 14 and make contact with the side surface 17. As can be appreciated, the contact created between the support brackets 32 and side surface 17 prevents the canopy 11 from moving along the width of the sidewalls 14. Also shown is the space 61 between the canopy sidewalls 35 and the support brackets 32, which permits air to flow under the canopy 11 to prevent heat buildup that could otherwise be caused by the heating element.

Figures 7, 8:
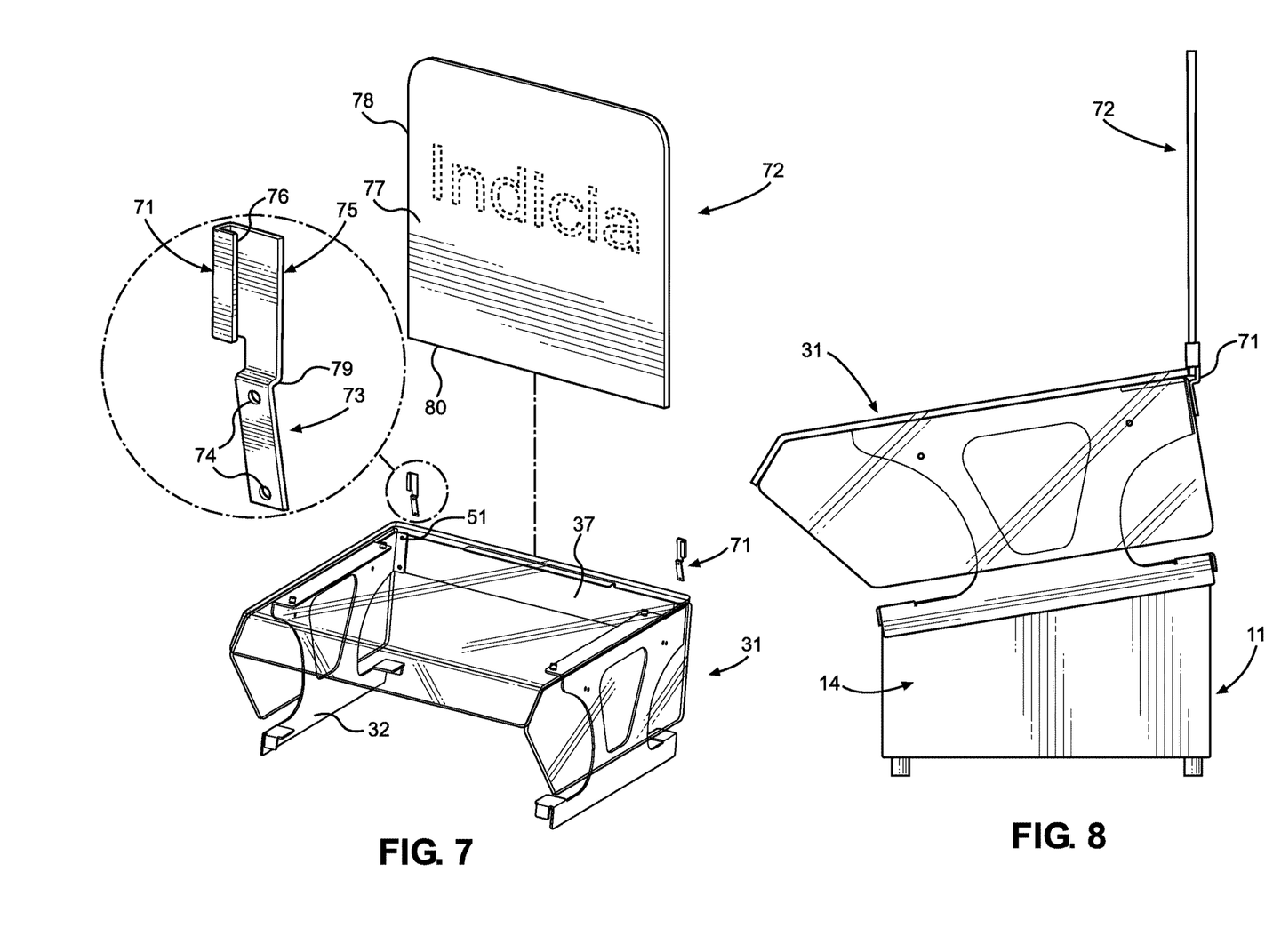
FIG. 7 shows an exploded view of the canopy cover, canopy header brackets, and header graphic custom sign.
FIG. 8. shows a side view of the canopy cover, canopy header brackets, and header graphic custom sign positioned on the roller grill.

Referring now to FIG. 7, there is shown an exploded view of the canopy cover 31, canopy header brackets 71, and a header graphic custom sign 72. In addition to protecting the food contained on the roller grill, the canopy 31 further functions as an advertising platform by supporting a header sign 72. The canopy header bracket 71 supports the header sign 72 above the posterior end of the canopy 31. The bracket 71 includes a lower section 73 comprising a pair of apertures 74 for accepting a screw, an upper section 75 comprising a J-shaped channel 76 for accepting and supporting the face 77 and side 78 of the header sign 72, and a shelf 79 for supporting the end 80 of the header sign 72. The shelf 79 is created by a bend between the upper section 75 and lower section 73 that enables support of the header sign 72 when positioned thereon.

The canopy header bracket 71 attaches to the support bracket 32 via screws 51 that also function to hold the back canopy cover 37 in position. The back canopy cover 37 is positioned between the support bracket 32 and the canopy header bracket 71. Alternatively, the bracket 71 can be formed as an extension of the support bracket 32. The header sign 72 is supported between the J-shaped channels 76 and rests on the shelf 79. As can be appreciated, the header sign 72 is constructed with a thickness that enables placement within the J-shaped channels 76 and with a width that matches the width of the header brackets 71 to allow for support thereby. The header sign 72 can be easily secured in position via the header brackets 71 by sliding the sides 78 of the sign 72 into the J-shaped channel 76 until the end 80 rests on the shelf 79. No fasteners are required for supporting the sign 72, which provides for quick insertion, removal, and replacement thereof.

Referring now to FIG. 8, there is shown a side view of the canopy cover 31, canopy header brackets 71, and header graphic custom sign 72 positioned on a roller grill 11. As is evident from the provided side view, the sidewalls 14 of roller grills 11 have a slope, which in turn causes the canopy cover 31 to similarly slope. The slope of the canopy cover 31 would in turn cause the header sign 72 to slope, which would be aesthetically displeasing. To prevent the header sign 72 from sloping, the header brackets 71 include a bend between the upper section 75 and lower section 73 (as best illustrated in FIG. 7) that enables the header sign 72 to be positioned at 90 degrees with respect to the surface that the roller grill 11 is positioned on. As can be appreciated, an advertising sign, such as the header sign 72, that is positioned perpendicular to a surface, such as a table or floor, is more aesthetically pleasing than a sign that cannot be properly viewed due to it being angled towards the ground.

Figure 9:
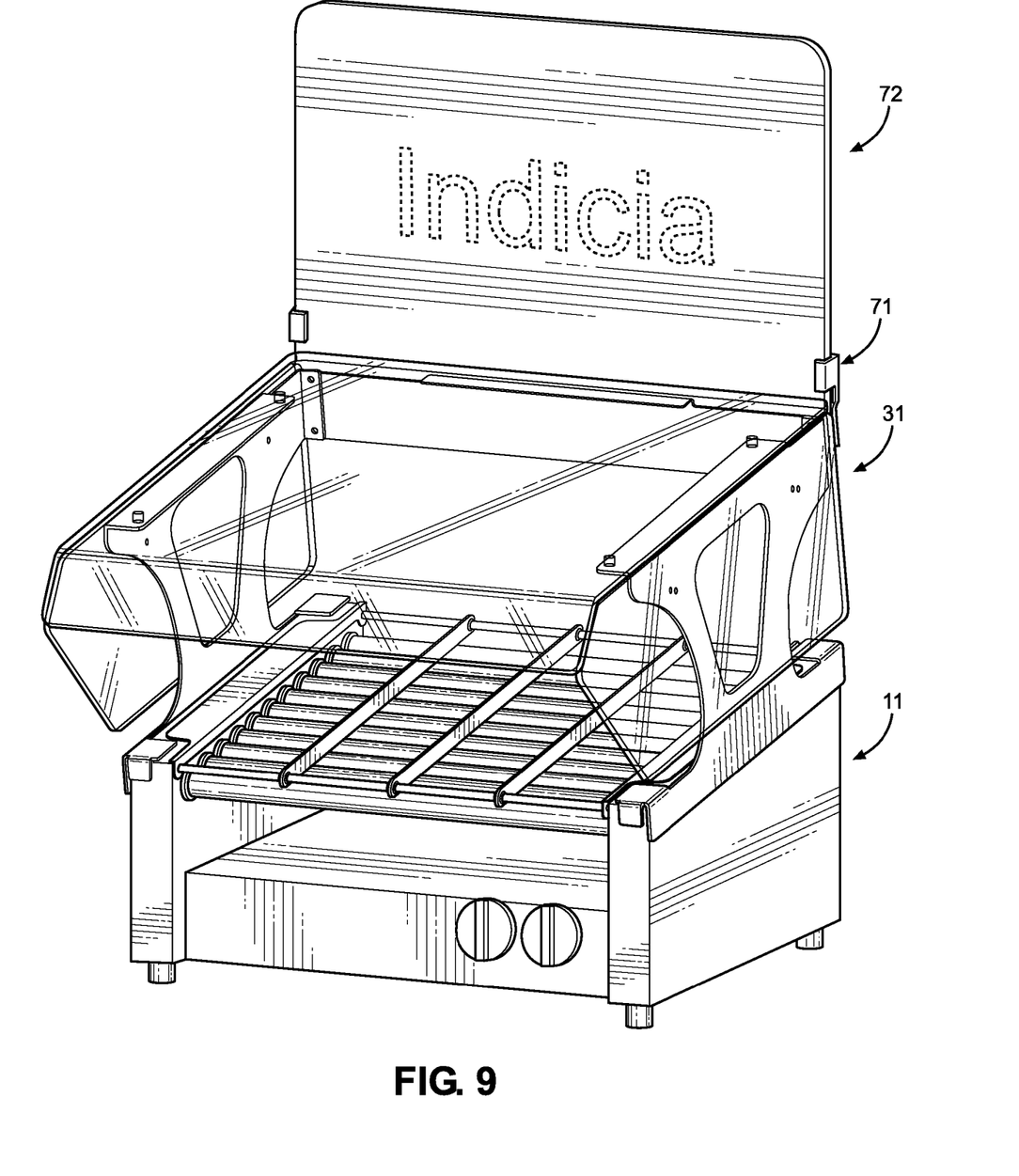
FIG. 9 shows a perspective view of the canopy cover, canopy header brackets, and header graphic custom sign positioned on the roller grill.

Referring now to FIG. 9, there is shown a perspective view of the canopy cover 31, canopy header brackets 71, and header graphic custom sign 72 positioned on the roller grill 11. The header graphic custom sign 72 is positioned at the back end of the canopy cover 31 and provides a means for advertising. Non-limiting examples of the advertising means can include the brand of the store the grill 11 is contained in, the brand of the food items provided for sale on the grill 11, the price of the food items available for purchase on the grill 11, or a promotional/seasonal sign related to the food items on the grill 11. The header sign 72 can be constructed from any desired material, including cardboard, plastic, metal, and the like. Additionally, the header sign 72 may include any desirable indicia, such as artwork, logos, or letters and numbers printed thereon. Alternately, the header sign 72 may include a writable surface (such as those found on a dry-erase board or chalkboard), a ferromagnetic surface for displaying magnetic indicia, or a solid surface that various indicia can be attached to.

As discussed above, the header sign 72 can be easily secured in position via the header brackets 71 without requiring fasteners or another permanent mounting solution. This support system allows the header sign 72 to be quickly installed and removed without the need for specialized tools or equipment. As can be appreciated, this system affords a user with the ability to remove and replace header signs 72 as often as desired. A non-limiting example would be the use of a first sign to advertise for a lunch special, and a second sign that is used later in the day to advertise for a dinner special.

Overall, the present invention provides a new and improved canopy cover for a roller grill assembly that works in conjunction with a roller grill food separating device. The canopy support brackets are designed to allow for simultaneous use of a food separating device. Use of a canopy and food separating device protects food from contaminants caused by coughing and sneezing while also segregating the food products to prevent cross contamination that can be caused by mixing cooked and uncooked food. The canopy further provides a support system for supporting an advertising sign that can be quickly attached and removed as needed.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A canopy cover for a roller grill assembly, said roller grill assembly having a housing comprising a main body and a pair of sidewalls extending above said body and further comprising front, back, side, and upper surfaces, said canopy cover comprising:
   a pair of canopy support brackets extending above said roller grill assembly, wherein said brackets contact said front, back, side, and upper surfaces of said roller grill sidewalls to support said canopy on said roller grill sidewalls, wherein said support brackets further comprise a pair of vertical and horizontal tabs adapted to allow a pair of food separating device support brackets of a food separating device to contact and rest between said canopy support brackets and upon said upper surfaces of said roller grill sidewalls;
   a pair of canopy sidewalls attached to said canopy support brackets;
   a front canopy cover attached to said canopy sidewalls;
   a back canopy cover attached to said canopy sidewalls; and
   a top canopy cover attached at either end to said canopy support brackets and to said front canopy cover and to said back canopy cover.

2. The device of claim 1, wherein said canopy cover vertical and horizontal tabs make contact with and are supported by distal ends of said roller grill sidewall upper surface, wherein said food separating device brackets are sized to fit between said horizontal tabs, and wherein said vertical and horizontal tabs and said food separating device brackets cover the entire surface of said sidewall upper surface.

3. The device of claim 1, wherein said vertical tabs secure said canopy cover on said roller grill sidewall upper surface and prevent said canopy from sliding along the length of said sidewall upper surface.

4. The device of claim 3, wherein said vertical tabs extend down and make contact with said front and back surfaces of said sidewalls.

5. The device of claim 1, wherein said canopy support brackets extend down and below said vertical tabs to create an L-shaped configuration with said horizontal tabs, wherein said L-shaped configuration prevents said canopy from sliding along the width of said sidewall upper surface.

6. The device of claim 1, wherein said canopy cover is constructed of a transparent material.

7. The device of claim 1, wherein said canopy cover comprises a pair of canopy header brackets that support a header graphic custom sign.

8. The device of claim 7, wherein said canopy header brackets comprise a lower section comprising a pair of apertures for accepting a screw, an upper section comprising a J-shaped channel for accepting and supporting a face and side of said header sign, and a shelf for supporting an end of said header sign, wherein said shelf is created by a bend between said upper section and said lower section that enables support of said header sign when positioned thereon.

9. The device of claim 7, wherein said canopy header bracket bend enables said header sign to be positioned at 90 degrees with respect to a surface that said roller grill is positioned on.

10. A canopy cover for a roller grill assembly, said roller grill assembly having a housing comprising a main body and a pair of sidewalls extending above said body and further comprising front, back, side, and upper surfaces, said canopy cover comprising:
   a pair of canopy support brackets extending above said roller grill assembly, wherein said brackets contact said front, back, side, and upper surfaces of said roller grill sidewalls to support said canopy on said roller grill sidewalls, wherein said support brackets further comprise a pair of vertical and horizontal tabs to allow said food separating device support brackets to contact and rest between said canopy support brackets and upon said upper surfaces of said roller grill sidewalls to support said food separating device thereon;

a pair of canopy sidewalls attached to said canopy support brackets;

a front canopy cover attached to said canopy sidewalls;

a back canopy cover attached to said canopy sidewalls;

a top canopy cover attached at either end to said canopy support brackets and to said front canopy cover and to said back canopy cover, and a pair of canopy header brackets that support a header graphic custom sign.

11. The device of claim 10, wherein said canopy cover vertical and horizontal tabs make contact with and are supported by distal ends of said roller grill sidewall upper surface, wherein said food separating device brackets are sized to fit between said horizontal tabs, and wherein said vertical and horizontal tabs and said food separating device brackets cover the entire surface of said sidewall upper surface.

12. The device of claim 10, wherein said vertical tabs secure said canopy cover on said roller grill sidewall upper surface and prevent said canopy from sliding along the length of said sidewall upper surface.

13. The device of claim 12, wherein said vertical tabs extend down and make contact with said front and back surfaces of said sidewalls.

14. The device of claim 10, wherein said canopy support brackets extend down and below said vertical tabs to create an L-shaped configuration with said horizontal tabs, wherein said L-shaped configuration prevents said canopy from sliding along the width of said sidewall upper surface.

15. The device of claim 10, wherein said canopy cover is constructed of a transparent material.

16. The device of claim 10, wherein said canopy header brackets comprise a lower section comprising a pair of apertures for accepting a screw, an upper section comprising a J-shaped channel for accepting and supporting a face and side of said header sign, and a shelf for supporting an end of said header sign, wherein said shelf is created by a bend between said upper section and said lower section that enables support of said header sign when positioned thereon.

17. The device of claim 16, wherein said canopy header bracket bend enables said header sign to be positioned at 90 degrees with respect to a surface that said roller grill is positioned on.

18. A canopy cover for a roller grill assembly, said roller grill assembly having a housing comprising a main body and a pair of sidewalls extending above said body and further comprising front, back, side, and upper surfaces, said canopy cover comprising:

a pair of canopy support brackets extending above said roller grill assembly, wherein said brackets contact said front, back, side, and upper surfaces of said roller grill sidewalls to support said canopy on said roller grill sidewalls, wherein said support brackets further comprise a pair of vertical and horizontal tabs to allow said food separating device support brackets to contact and rest between said canopy support brackets and upon said upper surfaces of said roller grill sidewalls to support said food separating device thereon;

a pair of canopy sidewalls attached to said canopy support brackets;

a front canopy cover attached to said canopy sidewalls;

a back canopy cover attached to said canopy sidewalls;

a top canopy cover attached at either end to said canopy support brackets and to said front canopy cover and to said back canopy cover; and a pair of canopy header brackets that support a header graphic custom sign, wherein said canopy header brackets comprise a lower section comprising a pair of apertures for accepting a screw, an upper section comprising a J-shaped channel for accepting and supporting a face and side of said header sign, and a shelf for supporting an end of said header sign, wherein said shelf is created by a bend between said upper section and said lower section that enables support of said header sign when positioned thereon.

19. The device of claim 18, wherein said canopy cover vertical and horizontal tabs make contact with and are supported by distal ends of said roller grill sidewall upper surface, wherein said food separating device brackets are sized to fit between said horizontal tabs, and wherein said vertical and horizontal tabs and said food separating device brackets cover the entire surface of said sidewall upper surface.

20. The device of claim 18, wherein said canopy header bracket bend enables said header sign to be positioned at 90 degrees with respect to a surface that said roller grill is positioned on.

\* \* \* \* \*